(12) United States Patent
Jeon et al.

(10) Patent No.: US 9,252,442 B2
(45) Date of Patent: Feb. 2, 2016

(54) SYSTEM AND METHOD FOR CONTROLLING FUEL CELL SYSTEM

(71) Applicant: Hyundai Motor Company, Seoul (KR)

(72) Inventors: Soon Il Jeon, Gyeonggi-do (KR); Sang Uk Kwon, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 13/714,030

(22) Filed: Dec. 13, 2012

(65) Prior Publication Data

US 2014/0081497 A1    Mar. 20, 2014

(30) Foreign Application Priority Data

Sep. 19, 2012  (KR) .................. 10-2012-0104243

(51) Int. Cl.
| | | |
|---|---|---|
| G06F 7/00 | (2006.01) | |
| H01M 8/04 | (2006.01) | |
| B60K 1/00 | (2006.01) | |
| B60W 20/00 | (2006.01) | |
| B60K 16/00 | (2006.01) | |
| H01M 8/00 | (2006.01) | |
| B60L 11/18 | (2006.01) | |

(52) U.S. Cl.
CPC ...... *H01M 8/04753* (2013.01); *H01M 8/04395* (2013.01); *H01M 8/04589* (2013.01); *H01M 8/04604* (2013.01); *B60L 11/1883* (2013.01); *B60L 11/1885* (2013.01); *H01M 8/0491* (2013.01); *H01M 8/04992* (2013.01); *H01M 2250/20* (2013.01); *Y02E 60/50* (2013.01); *Y02T 90/32* (2013.01); *Y02T 90/34* (2013.01)

(58) Field of Classification Search
CPC .......... H01M 2250/20; B60L 11/1883; B60L 11/1885; Y02E 60/50; Y02T 90/32; Y02T 90/34
USPC ............... 701/22, 104, 109; 429/444, 535; 903/903; 180/65.1, 65.31, 65.265
See application file for complete search history.

(56) References Cited

U.S. PATENT DOCUMENTS

| | | | | |
|---|---|---|---|---|
| 5,771,476 | A | * | 6/1998 | Mufford et al. .................. 701/22 |
| 5,934,255 | A | * | 8/1999 | Dalton et al. .................. 123/478 |
| 5,991,670 | A | * | 11/1999 | Mufford et al. .................. 701/22 |

(Continued)

FOREIGN PATENT DOCUMENTS

| | | | |
|---|---|---|---|
| DE | 10 2009 051 698 A1 | 5/2011 | |
| JP | 07075214 A | 3/1995 | |

(Continued)

*Primary Examiner* — Fadey Jabr
*Assistant Examiner* — Angelina Shudy
(74) *Attorney, Agent, or Firm* — Mintz Levin Cohn Ferris Glovsky and Popeo, P.C.; Peter F. Corless

(57) ABSTRACT

Disclosed is a system and method for controlling a fuel cell system. More specifically, a fuel cell demand current is calculated based on a driver demand current calculated from a driver demand torque. Then a target flow rate-1 of air to be supplied to a fuel cell stack is calculated based on the fuel cell demand current and a target stoichiometric ratio (SR) of air. The target flow rate-1 is then compensated for using the target SR, an RPM command value of an air blower is calculated based on a compensated target flow rate-2 and the amount of air currently measured. The operation of the air blower is subsequently controlled based on the calculated RPM command value.

16 Claims, 7 Drawing Sheets

(56) References Cited

U.S. PATENT DOCUMENTS

| | | | |
|---|---|---|---|
| 6,055,972 A * | 5/2000 | Fujimoto et al. | 123/688 |
| 6,890,675 B2 * | 5/2005 | Koschany | 429/439 |
| 7,971,538 B1 * | 7/2011 | Miller et al. | 105/50 |
| 8,048,580 B2 * | 11/2011 | Manabe et al. | 429/429 |
| 2004/0241504 A1 * | 12/2004 | Summers et al. | 429/13 |
| 2006/0134124 A1 * | 6/2006 | Lechler et al. | 424/184.1 |
| 2006/0154124 A1 * | 7/2006 | Fowler et al. | 429/22 |
| 2006/0263654 A1 * | 11/2006 | Goebel et al. | 429/13 |
| 2007/0082235 A1 * | 4/2007 | Sinha et al. | 429/13 |
| 2007/0111050 A1 * | 5/2007 | Matsumoto et al. | 429/17 |
| 2007/0190377 A1 * | 8/2007 | Elwart et al. | 429/22 |
| 2007/0287041 A1 * | 12/2007 | Alp et al. | 429/22 |
| 2008/0050626 A1 | 2/2008 | Kallo et al. | |
| 2008/0112865 A1 * | 5/2008 | Alward et al. | 423/212 |
| 2008/0206608 A1 * | 8/2008 | Lienkamp et al. | 429/13 |
| 2009/0268628 A1 * | 10/2009 | Hoe et al. | 370/252 |
| 2009/0269628 A1 * | 10/2009 | Imanishi et al. | 429/17 |
| 2010/0059020 A1 * | 3/2010 | Serai et al. | 123/458 |
| 2010/0068574 A1 * | 3/2010 | Naganuma | 429/22 |
| 2010/0081019 A1 * | 4/2010 | Yasuda et al. | 429/13 |
| 2010/0159340 A1 * | 6/2010 | Oomori | 429/432 |
| 2010/0304234 A1 * | 12/2010 | Kwon | 429/413 |
| 2010/0316926 A1 * | 12/2010 | Ishikawa et al. | 429/444 |
| 2011/0008691 A1 * | 1/2011 | Akiyama et al. | 429/415 |
| 2012/0204980 A1 * | 8/2012 | Nishizawa et al. | 137/561 R |
| 2012/0231375 A1 * | 9/2012 | Lu et al. | 429/530 |
| 2012/0288778 A1 * | 11/2012 | Kazuno et al. | 429/432 |
| 2014/0004438 A1 * | 1/2014 | Wake et al. | 429/444 |
| 2014/0095054 A1 * | 4/2014 | Serai et al. | 701/104 |

FOREIGN PATENT DOCUMENTS

| | | | |
|---|---|---|---|
| JP | 2000182648 A | | 6/2000 |
| JP | 2004071228 A | | 3/2004 |
| JP | 2005302489 A | * | 10/2005 |
| JP | 2005302563 A | * | 10/2005 |
| JP | 2007027047 A | * | 2/2007 |
| JP | 2007035508 A | | 2/2007 |
| JP | 2007280721 A | * | 10/2007 |
| JP | 201316831 A | * | 8/2013 |
| KR | 10-0623768 | | 12/2005 |
| KR | 10-2008-0053400 | | 6/2008 |
| KR | 10-2011-0036448 | | 4/2011 |
| KR | 2012060284 A | * | 6/2012 |
| KR | 20120060284 A | | 6/2012 |

* cited by examiner

SYSTEM AND METHOD FOR CONTROLLING FUEL CELL SYSTEM

CROSS-REFERENCE TO RELATED APPLICATION

This application claims under 35 U.S.C. §119(a) the benefit of Korean Patent Application No. 10-2012-0104243 filed Sep. 19, 2012, the entire contents of which are incorporated herein by reference.

BACKGROUND 1. (a) Technical Field

The present invention relates to a system and method for controlling a fuel cell system. More particularly, the present invention relates to a system and method for controlling a fuel cell system which minimizes excessive supply of air that is unintended and unnecessary and thus reduces unnecessary energy consumption for an operation of an air blower and improves fuel efficiency of a fuel cell vehicle as a result.

2. (b) Background Art

A fuel cell system as applied to a hydrogen fuel cell vehicle typically includes a fuel cell stack for generating electricity via an electrochemical reaction between reactant gases, a fuel processing system (FPS) for supplying hydrogen as a fuel to the fuel cell stack, an air processing system (APS) for supplying oxygen-containing air as an oxidant required for the electrochemical reaction in the fuel cell stack, and a thermal management system (TMS) for removing reaction heat from the fuel cell stack to outside of the fuel cell system, controlling an operating temperature of the fuel cell stack, and performing water management.

In the air processing system, external dry air is forcibly blown by an air blower into a membrane humidifier and, at the same time, supersaturated moist air discharged from a cathode outlet of the fuel cell stack is fed into the membrane humidifier. At this time, the dry air is humidified by water exchange between the dry air and the moist air, and the humidified air is supplied to the cathode inlet of the fuel cell stack.

At present, the air is supplied to the cathode of the fuel cell stack is about two times the stoichiometric ratio (SR. The amount of air supplied to the cathode affects the output of the fuel cell stack, the efficiency of the fuel cell system, the relative humidity of air, the water balance, etc. In particular, depending on the amount of air, when the operating temperature is low, such as during start-up or warm-up of the fuel cell system, flooding (excessive condensation) may occur. Furthermore, when the operating temperature increases, such as during high power operation, a polymer electrolyte membrane my dry out in the fuel cell stack. Thus, it is very important to optimally control the amount of air supplied to the cathode to improve the performance of the fuel cell.

As a conventional method for controlling the amount of air supplied, a method of calculating a target flow rate based on information related to the current of the fuel cell stack using an air stoichiometric ratio has been used. To control the amount of air supplied to the fuel cell stack, a controller calculates the target flow rate, calculates an RPM command value of the air blower such that the air is supplied to the fuel cell stack at the calculated target flow rate, and controls the RPM of the air blower to follow the calculated RPM command value. However, excess air may still be supplied to the cathode in this control method.

In particular, there is a difference between an SR calculated under actual operating conditions of the vehicle and a target SR as shown in FIG. 1. When the SR calculated under actual operating conditions is higher than the target SR, more than an optimum amount of air is supplied to the fuel cell stack (i.e., excessive supply of air). This means that the air blower is being operated more than is necessary to reach a target value, which consumes much more energy than necessary for the operation of the air blower, thus reducing the fuel efficiency of the fuel cell vehicle.

Moreover, during the operation of the air blower, significant noise is generated, and the water balance in the fuel cell stack is affected due to the unnecessary excessive supply of air, which may possibly cause the polymer electrolyte membrane to dry out, thus reducing the performance of the fuel cell.

The above information disclosed in this Background section is only for enhancement of understanding of the background of the invention and therefore it may contain information that does not form the prior art that is already known in this country to a person of ordinary skill in the art.

SUMMARY

The present invention provides a system and method for controlling a fuel cell system which supplies an accurate amount of air to a fuel cell stack and thus can prevent flooding and dry-out, which may occur in the fuel cell stack due to an excessive amount of air being supplied to the cathode. More specifically, the present invention provides a method for controlling a fuel cell system which can minimize an excessive supply of air that is unintended and unnecessary and thus can reduce unnecessary energy consumption for the operation of an air blower and improve fuel efficiency of a fuel cell vehicle.

Furthermore, the exemplary embodiment of the present invention provides a system and method for controlling a fuel cell system which can improve the power performance of the fuel cell system and prevent the generation of noise from an air blower during a transition period where the fuel cell current rapidly changes by controlling an air flow rate-based fuel cell current.

In one aspect, the present invention provides a method for controlling a fuel cell system, the method comprising: calculating, by a processor, a fuel cell demand current based on a driver demand current calculated from a driver demand torque; calculating, by the processor, a target flow rate-1 of air to be supplied to a fuel cell stack based on the fuel cell demand current and a target stoichiometric ratio (SR) of air; compensating for the target flow rate-1 using the target SR by the processor; calculating, by the processor, an RPM command value of an air blower based on a compensated target flow rate-2 and the amount of air currently measured; and controlling, by the processor, the operation of the air blower based on the calculated RPM command value.

In an exemplary embodiment, calculating the driver demand current may include: calculating a driver demand torque based on an accelerator pedal signal according to a driver's operation of an accelerator pedal and a vehicle running speed; calculating a drive demand current based on the driver demand torque, the vehicle speed, a bus voltage, and an efficiency of a motor or inverter; and calculating a final fuel cell demand current based on the driver demand current.

In another exemplary embodiment, calculating the final fuel cell demand current based on the driver demand current may include calculating a fuel cell demand current-1 based on the driver demand current, a vehicle auxiliary demand current, a fuel cell system balance of plant (BOP) demand current, and a battery assist current; and compensating for the fuel cell demand current-1 by a fuel cell compensation current comprising at least one of a compensation current for a fuel cell abnormal state and a compensation current for reactivity control during fuel cell restart-up.

In still another exemplary embodiment, compensating the target flow rate-1 using the target SR include: calculating an SR of air based on a measured fuel cell current and an air flow rate; calculating an SR ratio of the calculated SR of air to the target SR; determining whether the calculated SR ratio is a value between a predetermined minimum value and a predetermined maximum value; and setting the target flow rate-1 to a target flow rate-2 without compensation when the SR ratio is not a value between the minimum value and the maximum value and calculating the target flow rate-2 by compensating for the target flow rate-1 by the following equation (E1) when the SR ratio is a value between the minimum value and the maximum value:

$$\text{Target flow rate-2} = \text{Target flow rate-1}/(SR\ \text{Ratio} \times \text{Compensation coefficient}). \quad \text{E1:}$$

In yet another exemplary embodiment, the compensation coefficient may be set to a value based on the SR ratio.

In still yet another exemplary embodiment, the system and method of the present invention may further include: calculating an air flow rate-based fuel cell current limit value based on the target SR and an air flow rate currently measured; determining a minimum value between the air flow rate-based fuel cell current limit value and a maximum fuel cell current limit value as a final fuel cell current limit value; and limiting the current output of a fuel cell based on the final fuel cell current limit value.

In a further exemplary embodiment, the air flow rate-based fuel cell current limit value may be calculated from a value obtained by dividing the air flow by a current limit reference SR, the current limit reference being determined as a difference between the target SR and a predetermined offset value, and the offset value being set to a value that increases in proportion to an increase in the target SR and calculated from the target SR.

In another further exemplary embodiment, the target SR may be set to a value that increases in proportion to an increase in an estimated relative humidity (RH) value in the fuel cell stack and calculated from the estimated RH value in the fuel cell stack.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
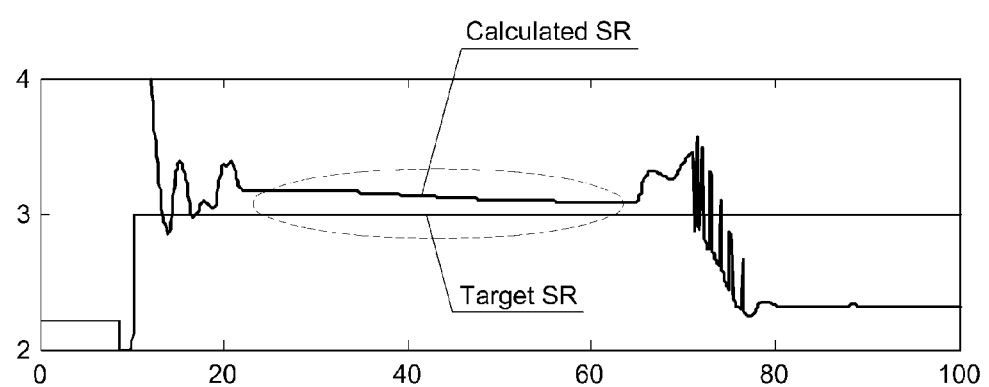
FIG. 1 is a diagram illustrating the problems associated with prior art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Additionally, it is understood that the below methods are executed by at least one controller. The term controller refers to a hardware device that includes a memory and a processor. The memory is configured to store the modules and the processor is specifically configured to execute said modules to perform one or more processes which are described further below.

Along these lines, the present invention provides a system and method for controlling a fuel cell system, the method including calculating, by a processor on a specifically configured controller, a fuel cell demand current from an accelerator pedal signal and a vehicle speed, calculating, by the processor, a target flow rate of air from the fuel cell demand current, compensating for the target flow rate of air using a target SR to follow a target SR of air by the processor, controlling the RPM of an air blower to follow the compensated target flow rate, calculating an air flow rate-based fuel cell current limit value and limiting, by the processor, the current based on the calculated current limit value.

Figure 2:
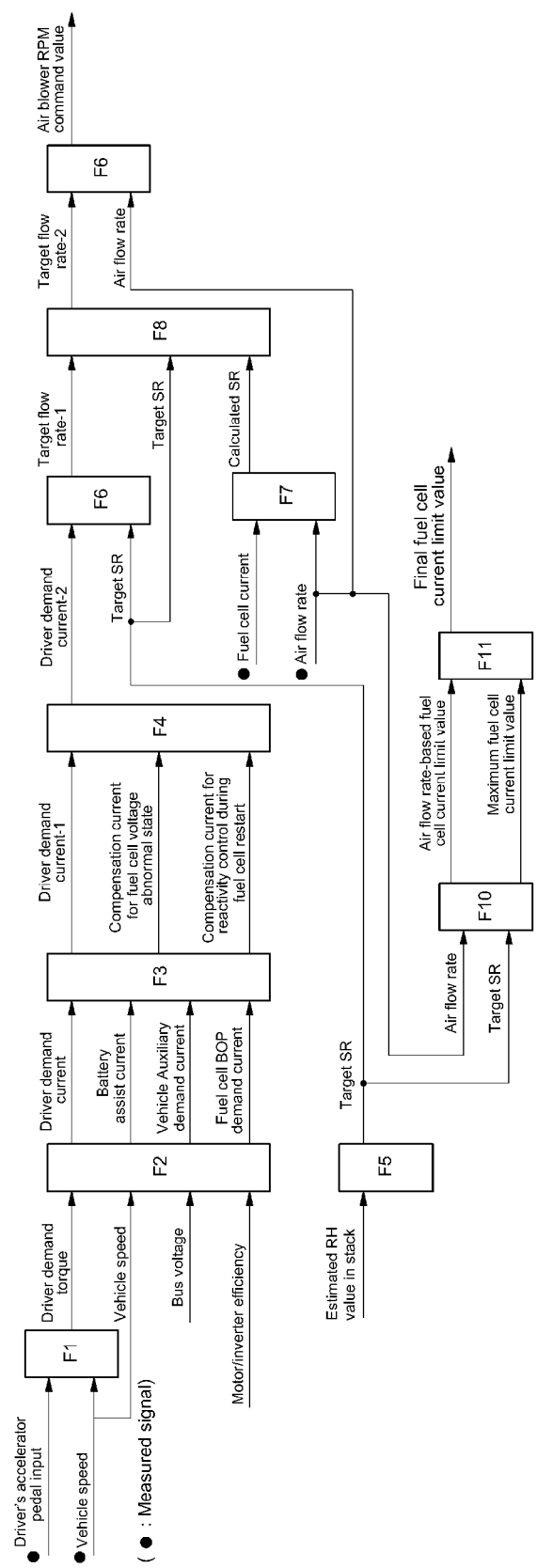
FIG. 2 is a diagram illustrating a method for controlling the supply of air and the fuel cell current in accordance with an exemplary embodiment of the present invention.

FIG. 2 is a diagram illustrating a system and method for controlling the supply of air and the fuel cell current in accordance with the present invention, and a process of controlling the supply of air based on a target SR will be described with reference to FIG. 2.

First, a controller calculates a driver demand torque by a typical torque calculation method. For example, the controller may calculate the driver demand torque based on an accelerator pedal signal (i.e., a signal based on a driver's operation of an accelerator pedal) indicating a driver's intention during running of a vehicle and a vehicle speed signal indicating the current vehicle speed (F1). Here, the driver demand torque corresponding to the current vehicle speed in proportion to the accelerator pedal signal may be calculated based on a motor performance curve. Then, a driver demand current may be calculated based on the driver demand torque, the vehicle speed, a bus voltage, and an efficiency of a motor or inverter. The driver demand current can be calculated by the following equation 1 (F2):

Driver demand current=Driver demand torque×Vehicle speed/Bus voltage/Efficiency of motor or inverter [Equation 1]

Here, the efficiency of the motor may be calculated from an efficiency map in which the efficiency is predefined based on the motor torque, speed etc., and the efficiency of the inverter may be calculated from an efficiency map in which the efficiency is predefined based on the current, voltage, etc. Then, a fuel cell demand current-1 is calculated based on the calculated driver demand current, a battery assist current, a vehicle auxiliary demand current of electronic parts such as an air conditioner, etc., a fuel cell balance of plant (BOP) demand current such as the air blower, pump, heater, etc. (F3).

Here, the fuel cell demand current-1 can be calculated by the following equation 2:

Fuel cell demand current-1=Driver demand current+Vehicle auxiliary demand current+Fuel cell BOP demand current−Battery assist current [Equation 2]

Then, a final fuel cell demand current-2 is calculated based on the calculated fuel cell demand current-1 and a fuel cell compensation current. The fuel cell compensation current is used to compensate for the amount of current required in addition to the fuel cell demand current-1 calculated based on the driver demand current, the vehicle auxiliary demand current, the fuel cell BOP demand current, etc. The fuel cell compensation current may include at least one of a compensation current for a fuel cell voltage abnormal state, which is preset to compensate for the occurrence of cell omission monitored by the controller, and/or a compensation current for reactivity control, which is preset to an amount of current additionally required during restart-up of the fuel cell (F4).

Accordingly, the final fuel cell demand current-2 can be calculated by the following equation 3:

Fuel cell demand current-2=Fuel cell demand current-1+Compensation current for fuel cell voltage abnormal state+Compensation current for reactivity control during fuel cell restart-up. [Equation 3]

Figure 3:
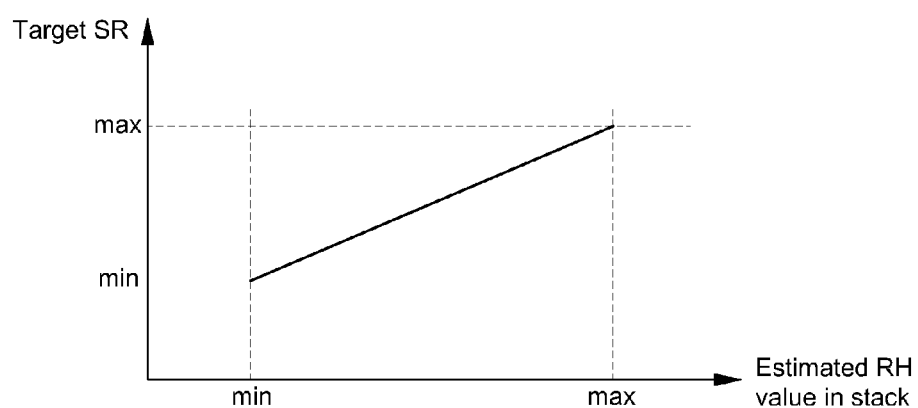
FIG. 3 is a diagram illustrating the calculation of a target SR in accordance with the exemplary embodiment of the present invention.

Meanwhile, an air target flow rate-1 may be calculated based on the fuel cell demand current-2 and a target SR of air (F6). Here, the target SR is calculated from a relative humidity (RH) value in the fuel cell stack estimated based on a sensor detection value and can be preset to a value that increases in proportion to an increase in the estimated RH value in the fuel cell stack as shown in FIG. 3.

The target flow rate-1 can be calculated by the following equation 4:

Target flow rate=Fuel cell demand current-2×Target SR×k1 [Equation 4]

where k1 is a predetermined constant.

Figure 4:
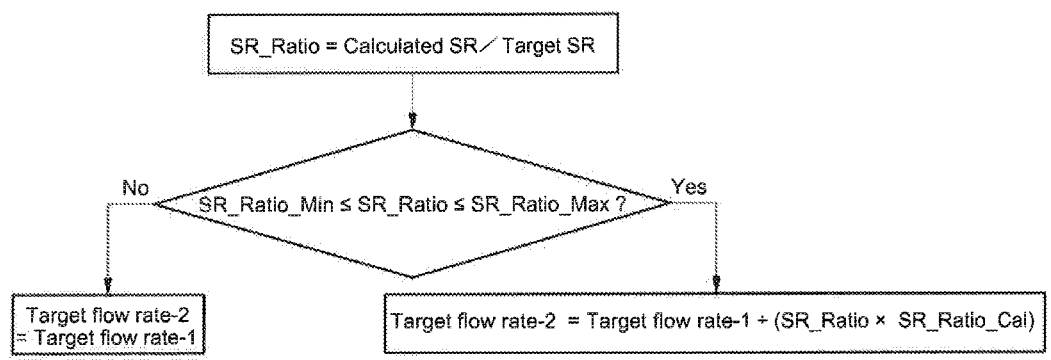
FIG. 4 is a diagram illustrating a method of calculating a target flow rate-2 in accordance with the exemplary embodiment of the present invention.
Figure 5A:
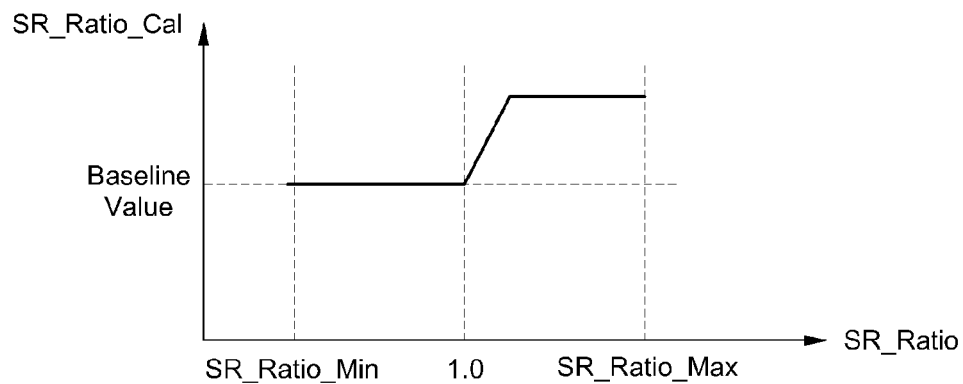
FIGS. 5A-C are diagrams illustrating the calculation of an SR compensation coefficient (SR_Ratio_Cal) in accordance with the exemplary embodiment of the present invention.
Figure 5B:
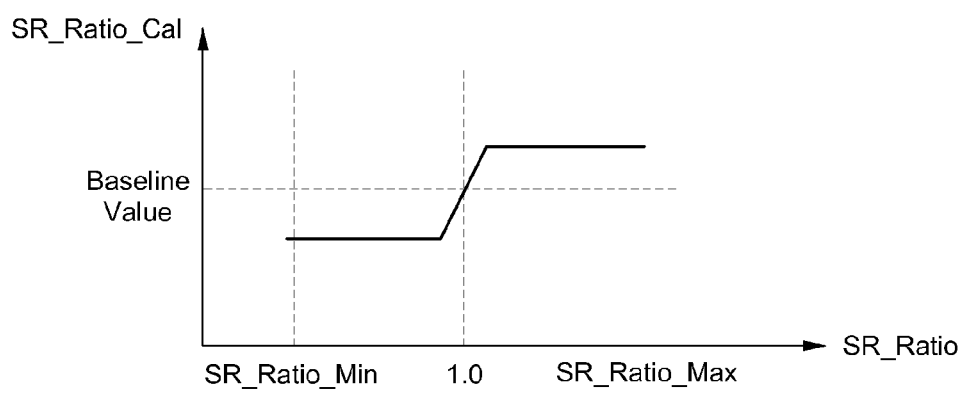
Figure 5C:
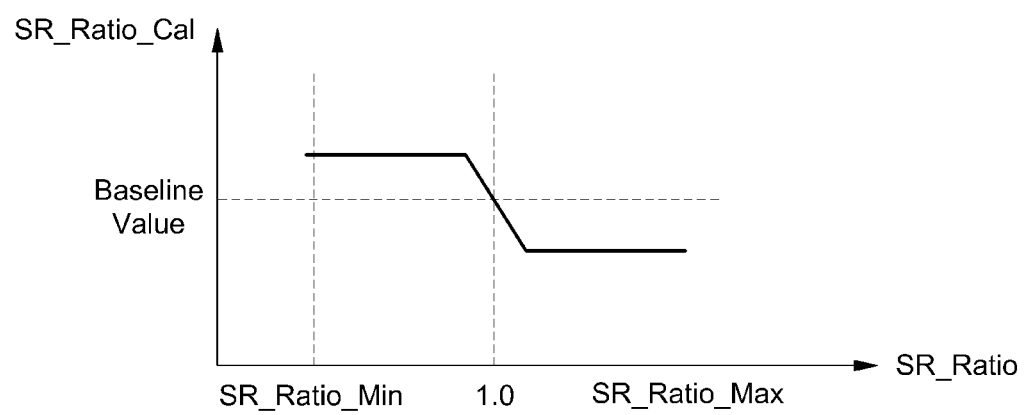

Then, the calculated target flow rate-1 is compensated for using the target SR to follow the target SR of air (F8). The calculation of a compensated target flow rate-2 will be described with reference to FIGS. 4 and 5 below.

First, the controller calculates the SR of air based on a fuel cell current and an air flow rate (F7), and the SR ratio (SR_Ratio) is calculated from the calculated SR and the target SR. Here, the calculated SR can be calculated by the following equation 5, and the SR ratio (SR_Ratio) can be defined as the following equation 6:

Calculated SR=Air flow rate/Fuel cell current×k2 [Equation 5]

where k2 is a predetermined constant.

SR ratio=Calculated SR/Target Sr [Equation 6]

Then, it is determined whether the SR ratio is a value between a predetermined minimum value (SR_Ratio_Min) and a predetermined maximum value (SR_Ratio_Max). When the SR (SR_Ratio) is not a value between the minimum value and the maximum value, the target flow rate-1 is used as it is and, when the SR (SR_Ratio) is a value between the minimum value and the maximum value, the compensated target flow rate-2 is calculated by the following equation 7:

Target flow rate-2=Target flow rate-1/(SR ratio×Compensation coefficient) [Equation 7]

Here, the significant ranges of the minimum value and the maximum value to follow the target SR can be set as follows:
0.5<SR_Ratio_Min<1.0
1.0<SR_Ratio_Max<2.0

Figure 6:
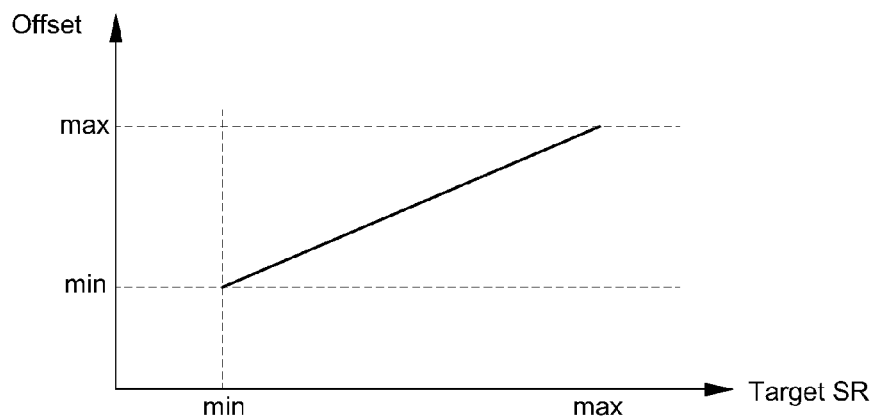
FIG. 6 is a diagram illustrating the calculation of an offset value used to calculate an air flow rate-based fuel cell current limit value in accordance with the exemplary embodiment of the present invention.
Figure 7:
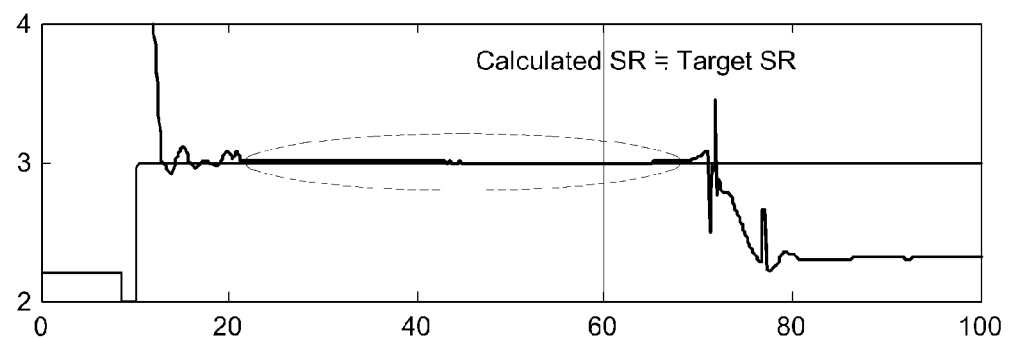
FIG. 7 is a diagram illustrating that an unnecessary excessive supply of air is prevented when a method for controlling a fuel cell system in accordance with the exemplary embodiment of the present invention is applied.

Moreover, the compensation coefficient (SR_Ratio_Cal) may be a value determined based on the SR ratio (SR_Ratio) between the minimum value (SR_Ratio_Min) and the maximum value (SR_Ratio_Max) as shown in FIG. 6. As such, the target flow rate-2, a compensated flow rate, is calculated based on the SR ratio of the calculated SR to the target SR and the compensation coefficient (F8).

When the compensated target flow rate-2 is calculated in the above manner, an RPM command value of the air blower is calculated based on the target flow rate-2 and the measured air flow rate so that the flow rate of air, which is actually supplied by the air blower, follows the target flow rate-2 (F9) rather than the target flow rate 1, and the amount of air supplied to the fuel cell stack is controlled by controlling the operation of the air blower based on the RPM command value. Here, the RPM command value of the air blower for PI control may be calculated based on a difference between the target flow rate-2 and the air flow rate ("Target flow rate-2"–"Air flow rate"), and the RPM of the air blower may be controlled based on the RPM command value.

Meanwhile, an air flow rate-based fuel cell current limit value may be calculated based on the target SR obtained from the estimated RH value in the fuel cell stack and the measured air flow rate (F10), and the flow rate-based fuel cell current limit value can be calculated by the following equation 8:

$$\text{Air flow rate-based fuel cell current limit value} = \text{Air flow rate/Current limit reference } SR \times k3 \quad \text{[Equation 8]}$$

where k3 is a predetermined constant.

In Equation 8, the current limit reference SR may be "Target SR−Offset value," and the offset may be set to a value that increases in proportion to an increase in the target SR in the fuel cell stack as shown in FIG. 6.

Then, when the air flow rate-based fuel cell current limit value is obtained, a final fuel cell current limit value may be calculated based on a minimum value obtained by comparing the air flow rate-based fuel cell current limit value and the maximum fuel cell current limit value (F11), and the controller limits the current output of the fuel cell based on the final fuel cell current limit value.

As described above, the method for controlling the fuel cell system according to the present invention provides the following advantages.

The target flow rate of air is compensated for using the target SR to follow the target SR of air, the operation of the air blower is controlled based on the compensated target flow rate, and thus an accurate amount of air can be supplied to the fuel cell stack. As a result, it is possible to prevent the occurrence of flooding and dry-out, which may occur in the fuel cell stack should the excess air not be contained Moreover, it is possible to minimize an excessive supply of air that is unintended and unnecessary, and thus it is possible to reduce unnecessary energy consumption for the operation of the air blower and improve the fuel efficiency of the fuel cell vehicle.

Furthermore, it is possible to improve the power performance of the fuel cell system and prevent the generation of noise in the air blower during a transition period in which the fuel cell current rapidly changes by controlling the air flow rate-based fuel cell current.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method for controlling a fuel cell system, the method comprising:
   calculating, by a processor, a fuel cell demand current based on a driver demand current calculated from a driver demand torque;
   calculating, by the processor, a first target flow rate of air to be supplied to a fuel cell stack based on the fuel cell demand current and a target stoichiometric ratio (SR) of air;
   calculating, by the processor, a calculated SR based on an air flow rate and a fuel cell current;
   compensating, by the processor, for the first target flow rate using the target SR and the calculated SR, wherein the target SR is calculated according to a relative humidity value of the fuel cell stack and is preset to increase proportionally based on the relative humidity and the calculated SR is equal to the air flow rate divided by the fuel cell current time a constant; and
   calculating, by the processor, a revolutions per minute (RPM) command value of an air blower based on a compensated second target flow rate and the amount of air currently measured and controlling the operation of the air blower based on the calculated RPM command value.

2. The method of claim 1, wherein calculating the driver demand current includes:
   calculating a driver demand torque based on an accelerator pedal signal according to a driver's operation of an accelerator pedal and a vehicle running speed;
   calculating a drive demand current based on the driver demand torque, the vehicle speed, a bus voltage, and an efficiency of a motor or inverter; and
   calculating a final fuel cell demand current based on the driver demand current.

3. The method of claim 2, wherein calculating the final fuel cell demand current based on the driver demand current includes:
   calculating a cell demand current based on the driver demand current, a vehicle auxiliary demand current, a fuel cell system balance of plant (BOP) demand current, and a battery assist current; and
   compensating for the fuel cell demand current by a fuel cell compensation current including at least one of a compensation current for a fuel cell abnormal state and a compensation current for reactivity control during fuel cell restart-up.

4. The method of claim 1, wherein compensating for the first target flow rate using the target SR includes:
   calculating an SR ratio of the calculated SR of air to the target SR;
   determining whether the calculated SR ratio is a value between a predetermined minimum value and a predetermined maximum value; and
   setting the first target flow rate to a second target flow rate without compensation if the SR ratio is not a value between the minimum value and the maximum value and calculating the second target flow rate by compensating the first target flow rate by the following equation (E1) if the SR ratio is a value between the minimum value and the maximum value:

$$\text{Second target flow rate} = \text{First target flow rate}/(SR \text{ Ratio} \times \text{Compensation coefficient}). \quad \text{E1:}$$

5. The method of claim 4, wherein the compensation coefficient is set to a value based on the SR ratio.

6. The method of claim 1, further comprising:
   calculating, by the processor, an air flow rate-based fuel cell current limit value based on the target SR and an air flow rate currently measured;
   determining, by the processor, a minimum value between the air flow rate-based fuel cell current limit value and a maximum fuel cell current limit value as a final fuel cell current limit value; and
   limiting, by the processor, the current output of a fuel cell based on the final fuel cell current limit value.

7. The method of claim 6, wherein the air flow rate-based fuel cell current limit value is calculated from a value obtained by dividing the air flow by a current limit reference SR, the current limit reference being determined as a difference between the target SR and a predetermined offset value, and the offset value being set to a value that increases in proportion to an increase in the target SR and calculated from the target SR.

8. The method of claim 1, wherein the target SR is set to a value that increases in proportion to an increase in an estimated relative humidity (RH) value in the fuel cell stack and calculated from the estimated RH value in the fuel cell stack.

9. A non-transitory computer readable medium containing program instructions executed by a processor, the computer readable medium comprising:
program instructions that calculate a fuel cell demand current based on a driver demand current calculated from a driver demand torque;
program instructions that calculate a first target flow rate of air to be supplied to a fuel cell stack based on the fuel cell demand current and a target stoichiometric ratio (SR) of air;
program instructions that calculated a calculated SR based on an air flow rate and a fuel cell current;
program instructions that compensate for the first target flow rate using the target SR and the calculated SR, wherein the target SR is calculated according to a relative humidity value of the fuel cell stack and is preset to increase proportionally based on the relative humidity and the calculated SR is equal to the air flow rate divided by the fuel cell current time a constant; and
program instructions that calculate a revolutions per minute (RPM) command value of an air blower based on a compensated second target flow rate and the amount of air currently measured and controlling the operation of the air blower based on the calculated RPM command value.

10. The non-transitory computer readable medium of claim 9, wherein program instructions that calculate the driver demand current include:
program instructions that calculate a driver demand torque based on an accelerator pedal signal according to a driver's operation of an accelerator pedal and a vehicle running speed;
program instructions that calculate a drive demand current based on the driver demand torque, the vehicle speed, a bus voltage, and an efficiency of a motor or inverter; and
program instructions that calculate a final fuel cell demand current based on the driver demand current.

11. The non-transitory computer readable medium of claim 10, wherein the program instructions that calculate the final fuel cell demand current based on the driver demand current include:
program instructions that calculate the fuel cell demand current based on the driver demand current, a vehicle auxiliary demand current, a fuel cell system balance of plant (BOP) demand current, and a battery assist current; and
program instructions that compensate for the fuel cell demand current by a fuel cell compensation current including at least one of a compensation current for a fuel cell abnormal state and a compensation current for reactivity control during fuel cell restart-up.

12. The non-transitory computer readable medium of claim 9, wherein the program instructions that compensate for the first target flow rate using the target SR include:
program instructions that calculate an SR of air based on a measured fuel cell current and an air flow rate;
program instructions that calculate an SR ratio of the calculated SR of air to the target SR;
program instructions that determine whether the calculated SR ratio is a value between a predetermined minimum value and a predetermined maximum value; and
program instructions that set the first target flow rate to a second target flow rate without compensation if the SR ratio is not a value between the minimum value and the maximum value and calculating the second target flow rate by compensating the first target flow rate by the following equation (E1) when the SR ratio is a value between the minimum value and the maximum value:

$$\text{Second target flow rate} = \text{First target flow rate}/(SR\ \text{Ratio} \times \text{Compensation coefficient}). \quad E1:$$

13. The non-transitory computer readable medium of claim 12, wherein the compensation coefficient is set to a value based on the SR ratio.

14. The non-transitory computer readable medium of claim 9, further comprising:
program instructions that calculate an air flow rate-based fuel cell current limit value based on the target SR and an air flow rate currently measured;
program instructions that determine a minimum value between the air flow rate-based fuel cell current limit value and a maximum fuel cell current limit value as a final fuel cell current limit value; and
program instructions that limit the current output of a fuel cell based on the final fuel cell current limit value.

15. The non-transitory computer readable medium of claim 14, wherein the air flow rate-based fuel cell current limit value is calculated from a value obtained by dividing the air flow by a current limit reference SR, the current limit reference being determined as a difference between the target SR and a predetermined offset value, and the offset value being set to a value that increases in proportion to an increase in the target SR and calculated from the target SR.

16. The non-transitory computer readable medium of claim 9, wherein the target SR is set to a value that increases in proportion to an increase in an estimated relative humidity (RH) value in the fuel cell stack and calculated from the estimated RH value in the fuel cell stack.

* * * * *